(12) United States Patent
Nielsen et al.

(10) Patent No.: US 12,054,289 B2
(45) Date of Patent: Aug. 6, 2024

(54) POWER-DISTRIBUTION SYSTEM FOR AN AIRCRAFT ON THE GROUND

(71) Applicant: ILLINOIS TOOL WORKS INC., Glenview, IL (US)

(72) Inventors: Bo Vork Nielsen, Morud (DK); Søren Risgaard Dahl, Odense (DK)

(73) Assignee: ILLINOIS TOOL WORKS INC., Glenview, IL (US)

( * ) Notice: Subject to any disclaimer, the term of this patent is extended or adjusted under 35 U.S.C. 154(b) by 50 days.

(21) Appl. No.: 17/907,894

(22) PCT Filed: Feb. 23, 2021

(86) PCT No.: PCT/US2021/019202
§ 371 (c)(1),
(2) Date: Aug. 29, 2022

(87) PCT Pub. No.: WO2021/178161
PCT Pub. Date: Sep. 10, 2021

(65) Prior Publication Data
US 2023/0339624 A1 Oct. 26, 2023

(30) Foreign Application Priority Data

Mar. 5, 2020 (EP) .................................... 20161286
Dec. 1, 2020 (EP) .................................... 20211052

(51) Int. Cl.
*B64F 1/36* (2024.01)
*H02J 4/00* (2006.01)
*H02J 7/00* (2006.01)

(52) U.S. Cl.
CPC ................ *B64F 1/362* (2013.01); *H02J 4/00* (2013.01); *H02J 7/0068* (2013.01); *H02J 2310/44* (2020.01); *H02J 2310/60* (2020.01)

(58) Field of Classification Search
CPC . B64F 1/362; H02J 4/00; H02J 7/0068; H02J 2310/44; H02J 2310/60
(Continued)

(56) References Cited

U.S. PATENT DOCUMENTS

2003/0151309 A1 8/2003 Hutton
2013/0279212 A1 10/2013 Leadingham

FOREIGN PATENT DOCUMENTS

EP          1 951 573 B1     2/2009
WO     WO 2008/107764 A2     9/2008
WO     WO-2017008865 A1 *    1/2017    .............. B64F 1/228

OTHER PUBLICATIONS

European Patent Office (EPO), Rijswijk, NL, International Search Report, Form PCT/ISA/210 for International Application No. PCT/US2021/019202, Apr. 13, 2021 (2 pp.).
(Continued)

*Primary Examiner* — Hal Kaplan
(74) *Attorney, Agent, or Firm* — Pauley Erickson & Swanson

(57) ABSTRACT

A power distribution system is provided for an aircraft on the ground, including a first electrical load, operably coupled to the aircraft on the ground and configured to receive at least a first portion of a predetermined maximum input power provided by a power supply; at least one second electrical load, electrically coupleable to the aircraft on the ground and configured to receive at least a second portion of the predetermined maximum input power provided by the power supply, and a controller, adapted to monitor at least one parameter of the power consumed by any one of the first and second electrical load, and control the power consumption of at least the first electrical load so that the total power consumption of the first and second electrical load does not exceed the predetermined maximum input power; wherein the predetermined maximum input power is provided via a
(Continued)

single power line between the power supply and an input port of the first electrical load.

17 Claims, 6 Drawing Sheets

(58) Field of Classification Search
USPC .......................................................... 307/9.1
See application file for complete search history.

(56) References Cited

OTHER PUBLICATIONS

European Patent Office (EPO), Munich, DE, Written Opinion of the Int'l Searching Authority for Int'l Appln No. PCT/US2021/019202, Form PCT/ISA/237, Apr. 13, 2021 (7 pp.).
EPO Communication Pursuant to Rule 114(2) EPC—Third Party Observations—for European Patent Application No. 20211052.4, 2023, Apr. 24, (1 page).
Third Party Observations re: European Patent Appiciation No. EP20211052, A Power-Distribution System for an Aircraft on the Ground, Applicant: Illinois Tool Works Inc., Apr. 18, 2023 (6 pages).

* cited by examiner

POWER-DISTRIBUTION SYSTEM FOR AN AIRCRAFT ON THE GROUND

CROSS REFERENCE TO RELATED APPLICATIONS

This application is a National Phase filing of PCT International Patent Application Number PCT/US2021/019202, filed on 23 Feb. 2021, which claims the priority to European Patent Application No. EP 20161286.8, filed 5 Mar. 2020 and European Patent Application No. EP 20211052.4, filed 1 Dec. 2020.

These applications are hereby incorporated by reference herein in their entirety and is made a part hereof, including but not limited to those portions which specifically appear hereinafter.

The present invention generally relates to ground support equipment (GSE) for airports, and in particular to preconditioned air units (PCA) and ground power units (GPU) supplied with electrical power from an external power grid.

INTRODUCTION

Upon landing, aircraft taxi to the gate where passengers disembark, and cargo and baggage is off-loaded. While at the gate, a variety of activities occur in preparation for the aircraft's next flight. During this time, aircraft usually require energy to power onboard systems, and which is typically supplied by the auxiliary power unit engine (APU). These engines not only provide the power necessary to start the main aircraft engines (the APU's primary purpose), but also continuously supply onboard power to support aircraft electronic systems (e.g. avionics), as well as, heating and cooling needs. However, APUs are gas turbine engines and require the use of jet fuel, leading to a high costs, noise pollution, $CO_2$ emissions etc. Consequently, there is an increasing trend of airports (e.g. London Heathrow, Copenhagen, Fraport etc.) banning, or at least reducing the use of APU engines.

In order to avoid running the APU on the ground, ground-based electric power from the airport terminal is provided through, for example, a solid-state ground power unit (GPU). Alternatively, the power can also be provided by a mobile ground support unit, for example, a GPU with an engine-driven 400 Hz generator. In fact, suitable mobile battery-powered GPUs (e.g. eGPUs) have recently been introduced to replace any fuel-engine powered equipment, so as to further reduce emissions on airports. Further, cabin air conditioning can also be powered on the ground instead of using the onboard APU. However, an air-conditioning unit, such as a preconditioned air unit (PCA) is necessary to provide efficient heating and cooling to the aircraft. Like the GPU, the PCA unit may be physically connected to the terminal via the gate, or as a mobile PCA unit.

Referring now to FIG. 1, a simplified schematic illustration shows a PCA unit 10 and two GPUs 12, 14 that are attached to the underside of the passenger boarding bridge 16 (also known as jet bridge).

In such a traditional layout, three power lines 18, 20, 22 (i.e. A, B and C) will feed the PCA 10 and the two Power Coils 12, 14 (a Power Coil including, for example, a 400 Hz, 90 kVA power supply and a cable coil in one single enclosure of the GPU), respectively. In this particular example, the PCA 10 may be an 'ITW GSE PCA 210', which is suitable for all types of aircrafts and all climates, and which has an intelligent control unit for automatically adapting the PCA's output temperature and airflow to the selected type of aircraft, as well as, the ambient temperature and humidity. Here, the nominal line current for the PCA 10 (e.g.) may be 345 A (Ampere), while the nominal line current for the Power Coils 12, 14 may be 141 A each. Consequently, three different panel boards 24, 26, 28 will have to be installed with the Airport Terminal 30 (e.g. in a technical room).

For example, at 3×400V grid voltage of the PCA panel 24 the installed (apparent) power may be 400V×(400 A+200 A+200 A)×$\sqrt{\sqrt{3}}$=554 kVA. Alternatively, the installed (apparent) power may be 400V×(400 A+160 A+160 A)×$\sqrt{\sqrt{3}}$=499 kVA.

As a result, the total costs for providing individual panel boards 24, 26, 28, as well as, the required cabling 18, 20, 22 (e.g. inside the extractable passenger boarding bridge 16, including energy chains) is naturally very high.

Also, knowing that the average power consumption for, for example, wide-body aircrafts (e.g. A340 or B787) never really exceeds 40 kVA per electrical connector, and the fact that the PCA 10 may only require nominal line current for a very short period (e.g. at extremely hot or cold weather conditions), it is clear that the presently provided installations are oversized in view of the aircraft load and the excessive complexity of the setup unnecessarily wastes a significant amount of resources.

Accordingly, it is an object of the present invention to provide an improved power-distribution system that is adapted to optimise the power supply and distribution to the ground support equipment (GSE), so as to reduce the amount of equipment required, as well as, the system complexity when providing power for servicing an aircraft on the ground, and that allows upgrading of existing gates where the preinstalled power supply is limited.

SUMMARY OF THE INVENTION

Preferred embodiment(s) of the invention seek to overcome one or more of the disadvantages of the prior art.

According to a first embodiment of the invention, there is provided a power distribution system for an aircraft on the ground, comprising:
  a first electrical load, operably coupled to the aircraft on the ground and configured to receive at least a first portion of a predetermined maximum input power provided by a power supply;
  at least one second electrical load, electrically coupleable to the aircraft on the ground and configured to receive at least a second portion of said predetermined maximum input power provided by said power supply, and
  a controller, adapted to monitor at least one parameter of the power consumed by any one of said first electrical load and said at least one second electrical load, and control the power consumption of at least said first electrical load so that the total power consumption of said first electrical load and said at least one second electrical load does not exceed said predetermined maximum input power;
  wherein said predetermined maximum input power is provided via a single power line between said power supply and an input port of said first electrical load.

This provides the advantage of optimising the power supply (i.e. simplicity of power distribution, reduced rating of power supply) of ground support equipment (GSE), such as, for example, ground power units (GPU) and preconditioned air units (PCA), as well as, the installation of a power supply for existing gates, but also any other load added to the ground support equipment for a parked aircraft, therefore, minimising costs. In particular, the power distribution system of the present invention provides the advantage of minimising the required maximum power (total nominal line current) that is provided from a power supply (e.g. power grid) by adaptively controlling power consumption of "less important" loads, such as, for example, a preconditioned air units (PCAs), which may simply be driven on a lower capacity (e.g. stepless control), to counter-balance the total power consumption such that a predetermined maximum input power is not exceeded and thus ensure the required power demand to load controlled equipment (e.g. GPUs) is always available.

In addition, the present invention provides the advantage of minimising the power supply (equipment) required to sufficiently and efficiently "feed" loads (e.g. GPU, PCA, eGPU) with different power requirements, by intelligently distributing the predetermined maximum input power between the attached loads (e.g. GPUs, PCA) from one of the loads (e.g. PCA), therefore, only requiring a single nominal power supply (e.g. from the Airport Terminal) provided to a first electrical load (e.g. a PCA) utilising a single power line cable. Further, the present invention eliminates the need for prioritising any of the coupled loads, since the self-regulating serial approach of the system uses a predetermined priority of the coupled loads (e.g. the first load (PCA) has always the lower priority over the second load (GPU)).

Advantageously, said first electrical load may be a preconditioned air unit (PCA) configured to provide air at a predetermined temperature to the aircraft on the ground. Preferably, said controller may be adapted to control the power consumed by said preconditioned air unit (PCA).

Advantageously, said at least one parameter may be an input current from said predetermined maximum input power provided to any one of said first electrical load and said at least one second electrical load.

Advantageously, the power distribution system may further comprise at least one third electrical load, configured to receive at least a third portion of said predetermined maximum input power provided by said power supply.

Advantageously, said controller may be adapted to control the power consumption of said at least one third electrical load so that the total power consumption of said first electrical load, said at least one second electrical load and said at least one third electrical load does not exceed said predetermined maximum input power.

Preferably, said at least one third electrical load may be a battery-powered Ground Power Unit (GPU) chargeable with at least said third portion of said predetermined maximum input power. Preferably, said controller may be adapted to control the charging current of said battery-powered GPU so that the total power consumption of any one of said first electrical load, said at least one second electrical load and said at least one third electrical load does not exceed said predetermined maximum input power.

Advantageously, said charging current may be controlled stepless via wireless communication or, alternatively, by selectively switching said charging current on and off.

Advantageously, said battery-powered GPU may be electrically coupleable to any one of said first electrical load, said power supply via any one of a pre-fused power outlet of said power supply and a splitter box, and said second electrical load.

Advantageously, said at least one second electrical load may be a Ground Power Unit (GPU).

Advantageously, said predetermined maximum input power may be a maximum power rating of said power supply.

Advantageously, the power distribution system may further comprise a control interface adapted to control said predetermined maximum input power provided by said power supply from a remote location.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

The exemplary embodiments of this invention will be described in relation to ground support equipment for an aircraft on the ground, such as, for example, a passenger boarding bridge equipped with a preconditioned air unit (PCA) and one or two GPU(s) (e.g. 400 Hz Power Coils).

However, it is understood by a person skilled in the art that the basic concept of the power distribution system of the present invention may be applied to any suitable layout, number and/or combination of ground support equipment without departing from the present invention. Also, it is understood that the scope of the invention is not limited to the specific design described for the example embodiment(s).

Further, in the context of this particular example of the present invention, it is understood that electrical loads supplied by the system include any ground support equipment, such as, power- and cabin-conditioning equipment (GPU, PCA), but also mobile GPUs and PCA units, auxiliary motors (e.g. cable reel motor of a Power Coil), or any monitoring equipment, as well as, the passenger boarding bridge (e.g. PCA and GPU(s) may be on standby when the passenger boarding bridge is operated). In addition, "predetermined maximum input power" and "input power" are used interchangeably and are understood to be the power required for the PCA and any one of the GPUs based on actual aircraft demands in contrast to the input ratings of the units (PCA, GPU etc.), i.e. a predetermined amount of power (or a maximum acceptable power consumption) that is "assigned" to a specific set of units for a specific aircraft type.

Figure 2:
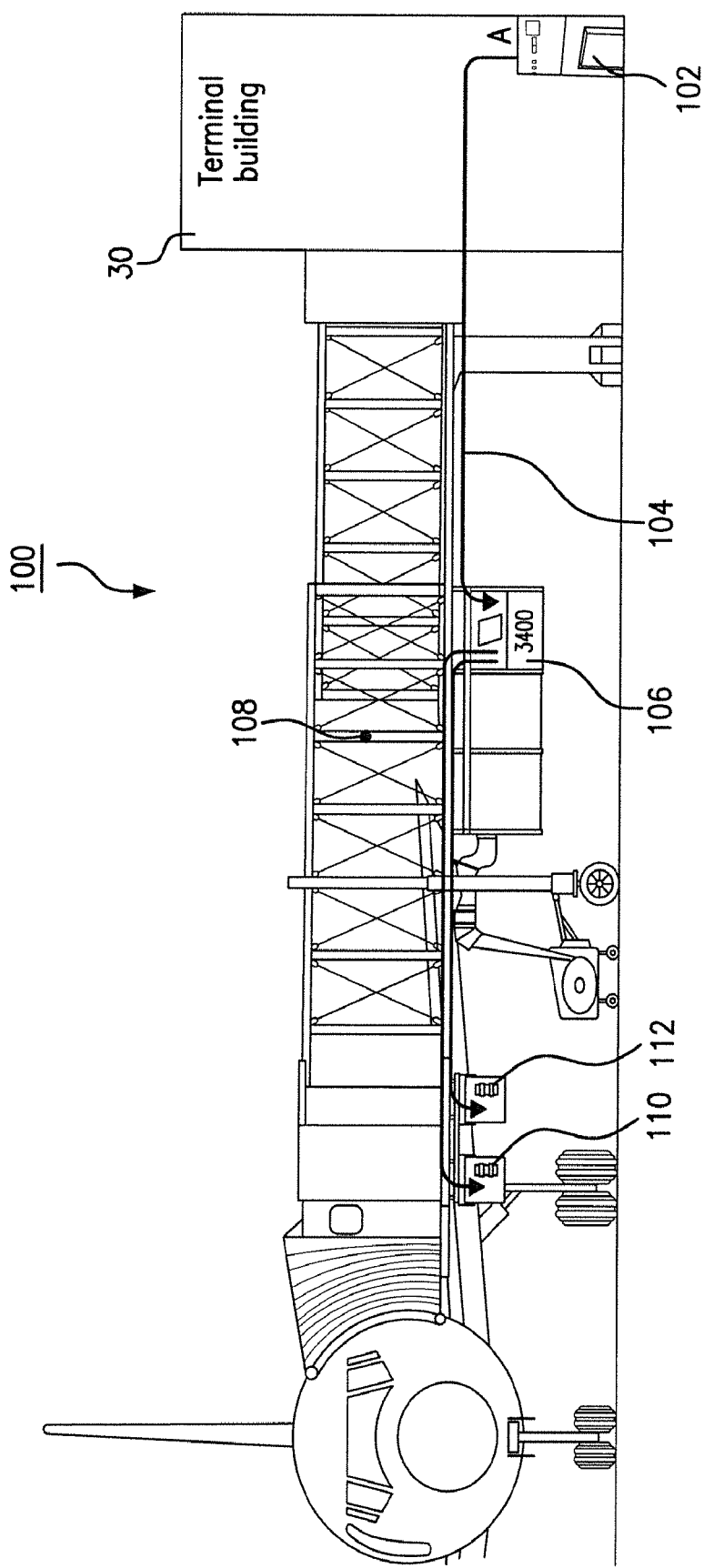
FIG. 2 shows a simplified schematic illustration of a so called "load-sharing" layout of ground support equipment servicing an aircraft on the ground with electrical power (via GPUs) and preconditioned air (PCAs) utilising an embodiment of the power distribution system of the present invention.

Referring now to FIG. 2, the new layout of the example power distribution system 100 comprises a single panel board 102 configured to supply a predetermined actual aircraft load via a single power line 104 to a preconditioned air unit (PCA) 106 attached to a passenger boarding bridge 108. Here, a single power line 104 is understood to include a bundle of cables, for example, for different phases and ground connection, routed from the terminal building 30 onto the passenger boarding bridge 108 and to the PCA 106. Thus, there are no other power lines 104 required between the terminal building and the PCA 106. Two ground power units (GPUs) 110, 112 are operably coupled to the input power supply through the PCA 106, i.e. each one via a single cable to the PCA 106. Here, the GPUs 110, 112 may be coupled to an input port of and in parallel with the PCA 106. A controller (not shown) is operably coupled between the GPUs 110, 112, the PCA 106 and the input power supply, monitoring the power consumption (i.e. by monitoring the current from the grid) of any one or any combination of the attached GPUs 110, 112 and PCA 106 and controls the PCA (and/or any other electrical GSE) so as to optimise (i.e. limit or match the total power consumption with the predetermined maximum amount of the input power) the total power consumption in accordance with the input power (i.e. not to exceed a predetermined maximum amount of the input power). The controller (not shown) may be incorporated into the PCA 106 and/or controlling the PCA 106 and any other dispensable load coupled to the system 100 from an external location either hardwired or wirelessly. Alternatively, the controller (not shown) may use Power Line Communication (PLC) through the existing power lines to control any of the system loads. In this particular example, the system 100 is understood to use a self-regulating "serial approach" where the demand of the GPU(s) 110, 112 always take(s) priority over the PCA 106 (i.e. the PCA 106 has the lowest priority). Consequently (and advantageously), there is no need for an additional prioritisation of any of the coupled loads, e.g. by another (external) controller.

In this particular example, the PCA 106 (i.e. the incorporated controller) is monitoring the total line current and, in those rare cases where the total current requested by the attached loads (GPUs, PCA, eGPU etc.) exceeds the rating of the panel board 102 and/or "feeding" power line 104, the PCA 106 (i.e. the incorporated controller) will control the PCA 106 so as to reduce the cooling power (or heating power) by utilising, for example, a variable speed compressor control such as described in EP2408669B1.

Figure 1:
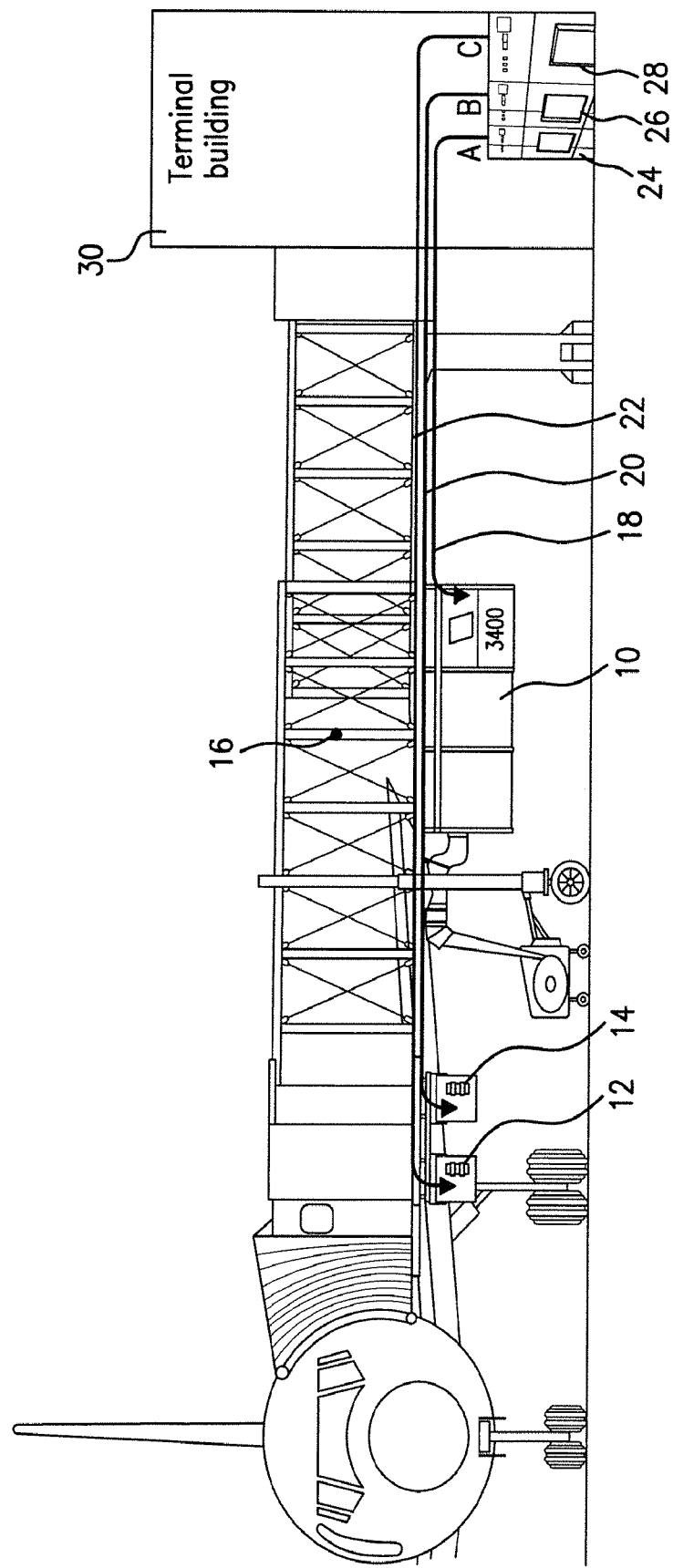
FIG. 1 (Prior Art) is a simplified schematic illustration of a typical known layout of ground support equipment servicing an aircraft on the ground (i.e. parked) with electrical power (via GPUs) and preconditioned air (PCAs)

For example, at 400V input voltage, installing one single 500 A (Ampere) panel board 102, equivalent to 346 kVA (400V×500 A×√3), will ensure the required power to the PCA 106 and GPUs 110, 112 and result in a substantial reduction of costs compared to the costs required for running a traditional system layout (see FIG. 1), as well as, significant cost savings related to the overall power distribution in the Airport Terminal building 30.

In addition, the predetermined maximum amount of the input power (i.e. maximum acceptable or allowed power consumption) may be controlled (adjusted, i.e. increased or decreased, limited or simply set) remotely, for example, via a RS-485 Modbus interface. Thus, in a potential "overload situation", the total power consumption taken by one or more gates (in case more than one gates are supplied) can be limited/adjusted via a central controller at a minimum of inconvenience to the passengers (though, remembering that the GPUs have priority to always receive the power requested by the aircraft).

As illustrated for this example, the so called "load sharing" of the power distribution system 100 of the present invention works similarly well in connection with passenger boarding bridges 108 servicing narrow-body aircrafts (e.g. A320, B737). A typical installation may consist of a smaller PCA 106 and only one GPU 110 (e.g. Power Coil). The relative savings may even be higher than for wide-body aircrafts, because the average power consumption for narrow body aircrafts is typically below 20 kVA.

Figure 3:
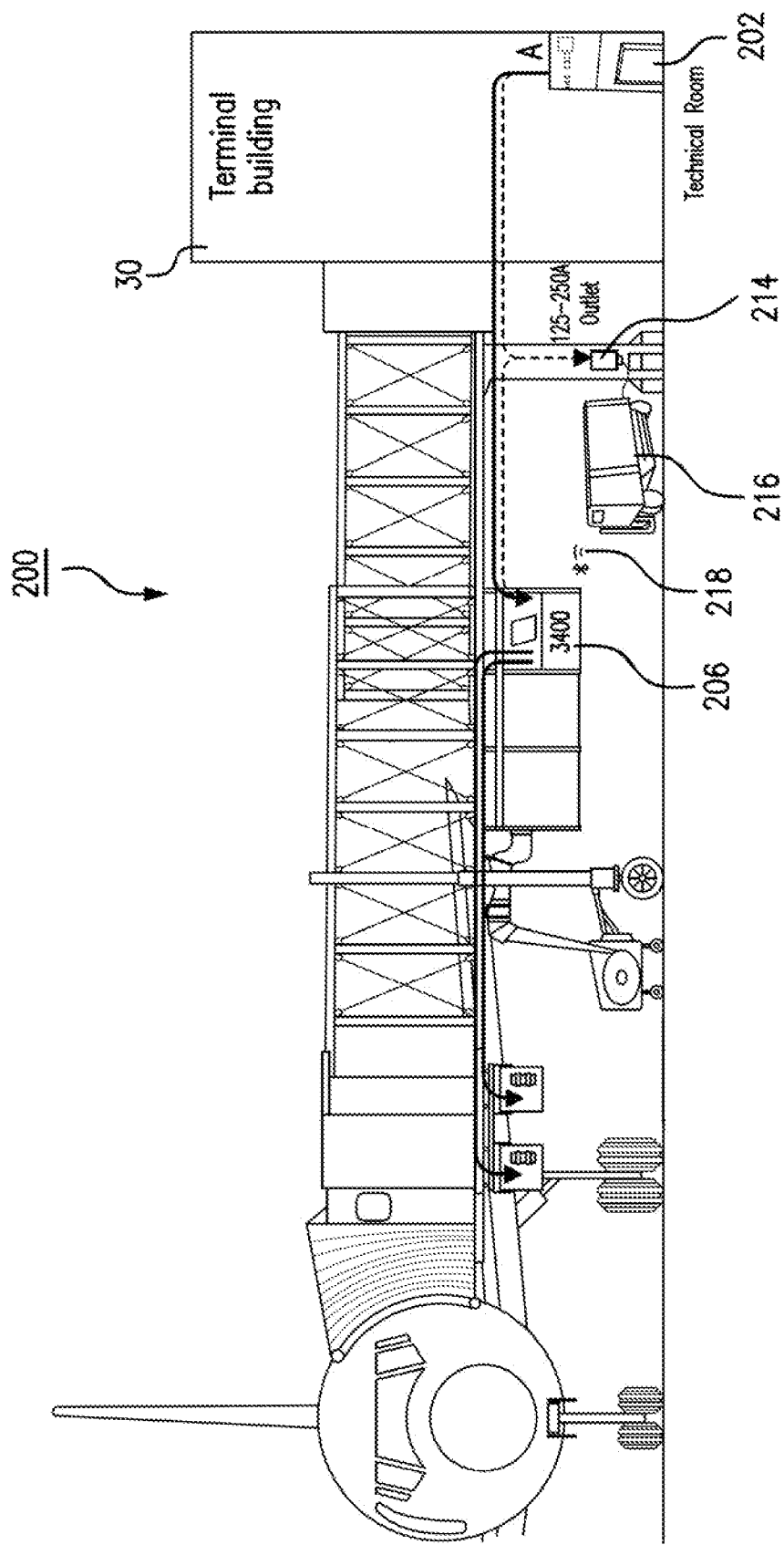
FIG. 3 shows a simplified schematic illustration of an extended "load-sharing" layout of ground support equipment (GSE) servicing an aircraft on the ground with electrical power (via GPUs) and preconditioned air (PCAs) utilising an alternative embodiment of the power distribution system of the present invention, for example, a battery powered GPU (e.g. eGPU) can be charged via a power outlet from the external power, or from the PCA.

FIG. 3 shows an illustration of another example embodiment 200 of the present invention including a pre-fused power outlet 214 (or a splitter box with fuses at the outlet) that is provided from the panel board 202 and can be used for charging one or more battery-powered GPU(s) 216 (e.g. eGPU or other eGSEs). In another example, the power outlet 214 may be provided from the PCA 206. Thus, instead of establishing a new and costly infrastructure for charging eGPUs 216, an existing power supply infrastructure can be utilised allowing the eGPUs 216 to be charged by the gates where the power supply is already available. A wireless controller 218 (incl. a wireless communication module), for example, integrated into the PCA 206 and/or eGPU 216, may control the maximum charging current taken by the eGPU 216 (i.e. limit), so as to never overload the system 200 (i.e. not exceed the total input power provided by the panel board 202). As a result, the eGPU 216 can be parked for charging at any convenient time without risking a power blackout.

Additionally, the power outlet 214 may be a power line allowing, for example, a mobile solid-state converter to be connected, in order to provide 400 Hz power in case of a GPU (e.g. power Coil) failure. Furthermore, an eGPU 216 may be equipped with a bidirectional onboard charger, so that the eGPU 216 can be used to support the power grid during peak periods, or even take fully over in the event of a power outage.

Figure 4A:
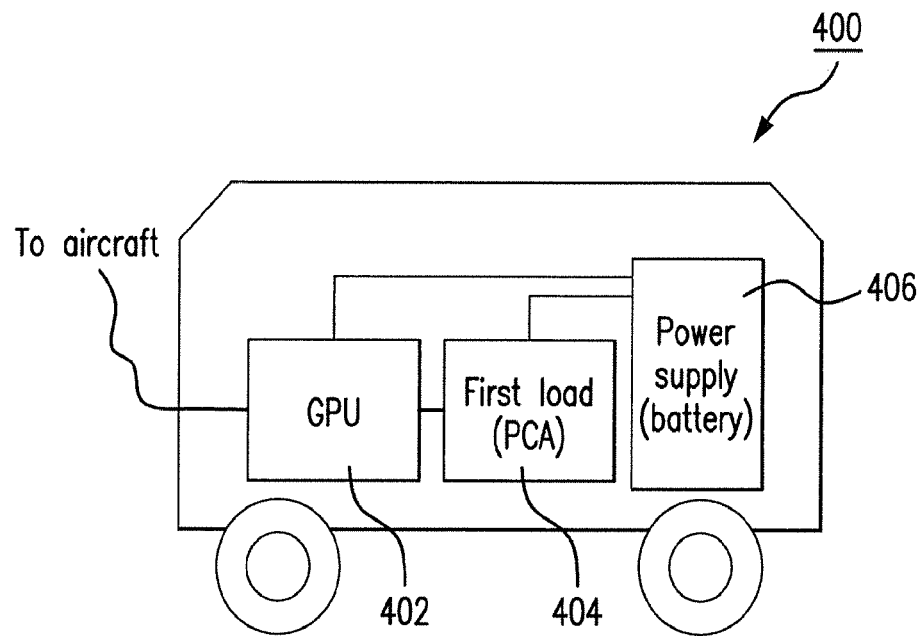
FIG. 4 shows a simplified schematic of (a) a mobile GSE combining battery-powered GPU and PCA and (b) two separate mobile GSEs, one for housing a battery-powered GPU and one for housing a PCA powered by the battery-powered GPU.
Figure 4B:
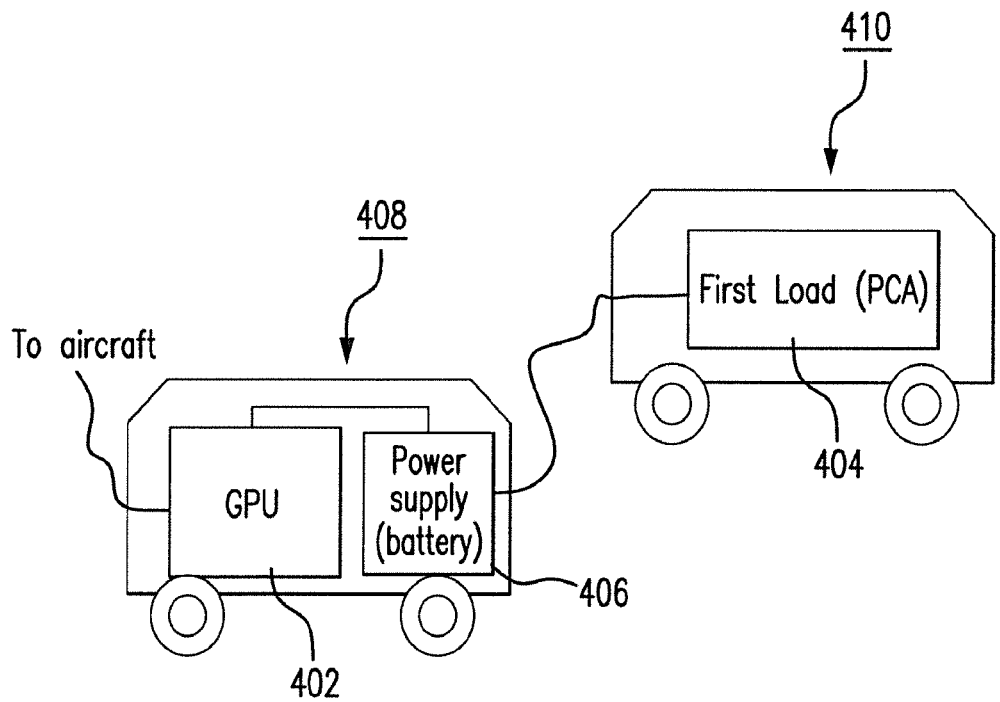
Figure 5A:
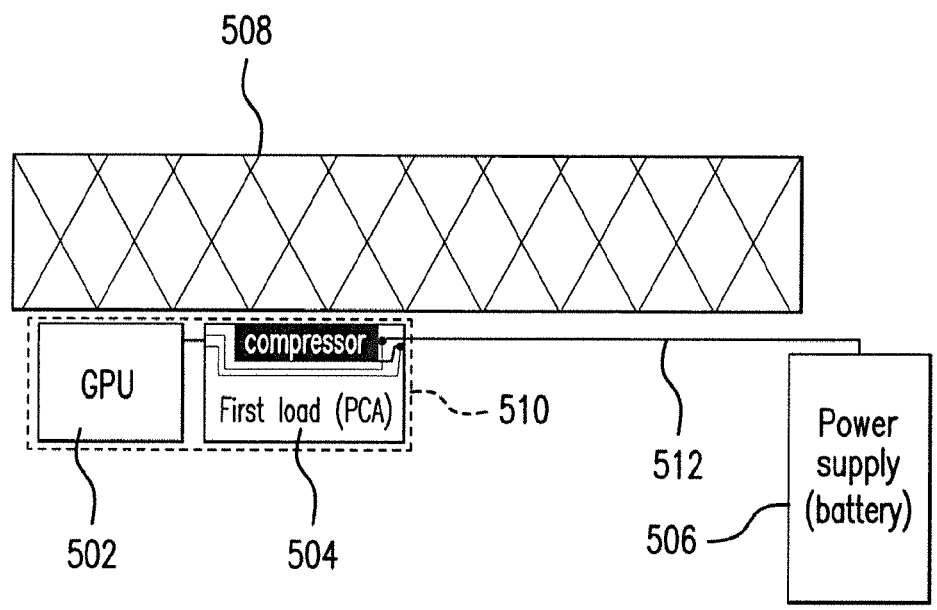
FIG. 5 shows a simplified schematic of a boarding bridge setup with installed GPU and PCA within an optional single housing, (a) with the GPU electrically coupled to the power supply from within the PCA and (b) with the GPU electrically coupled to the power supply from outside the PCA.
Figure 5B:
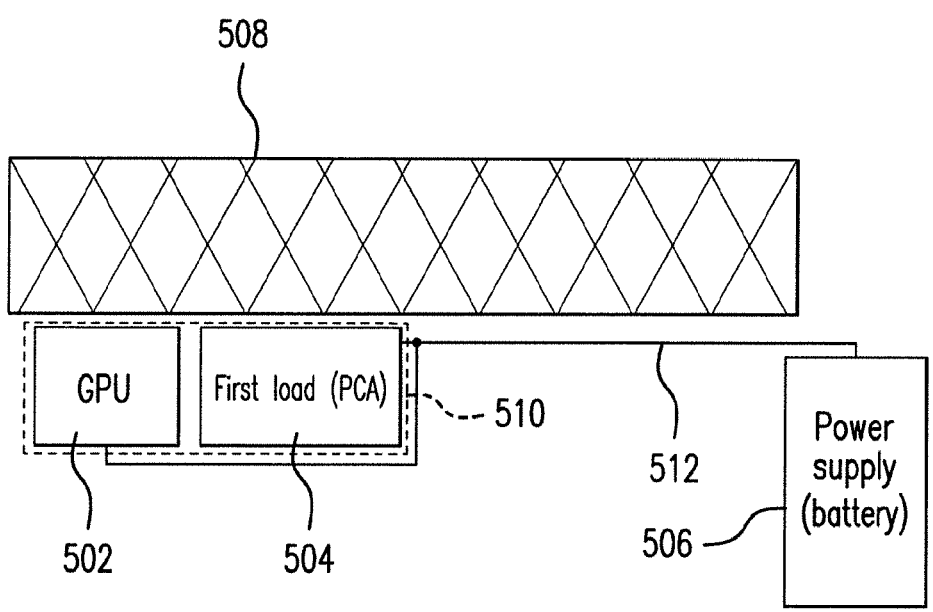

Referring now to FIGS. 4 (a) and (b), simplified schematics of different example embodiments of a mobile GSE unit(s) are illustrated. In one example embodiment (FIG. 4(a)), a mobile GSE unit 400 houses one or more GPU(s) 402 and a PCA 404, where each one of the GPU 402 (second electrical load) and PCA 404 (first electrical load) may be powered from an on-board power supply 406 (e.g. a battery). Alternatively, the GPU 402 (second electrical load) may be connected to the power supply 406 through the PCA 404 (first electrical load). In another example (FIG. 4(b)), one or more GPU(s) 402 (second electrical load) may be provided in a first mobile GSE unit 408 together with a power supply 406 (e.g. battery), and a PCA (first electrical load) 404 may be provided in a second mobile GSE unit 410 which is electrically connected to the power supply 406 provided in the first mobile GSE unit 408. FIGS. 5 (a), (b) and 6 (a), (b) show illustrations of different power distribution setups for a boarding bridge 508. One or more GPU(s) 502 and a PCA 504 may be provided in a single housing 510 that is attached to the underside of the boarding bridge 508, and a power supply 506 is configured to provide a predetermined maximum input power to any one of the GPU(s) 502 and PCA 504 utilising a single power line cable 512. The single housing 510 is optional for the embodiments shown in FIGS. 5(*a*) and (*b*), so the GPU(s) 502 and PCA 504 may either be in separate housings or comprised within a single housing 510.

In one example embodiment (i.e. FIG. 5(*a*)), the GPU(s) 502 may be electrically coupled to the power supply 506 from within the PCA 504 (e.g. plugs or sockets), wherein, in another example embodiment (i.e. FIG. 5(*b*)), the GPU(s) 502 may be electrically coupled to the power supply 506 from a connection to the power line cable 512 outside the PCA 504 (and outside the housing 510, if present).

Figure 6A:
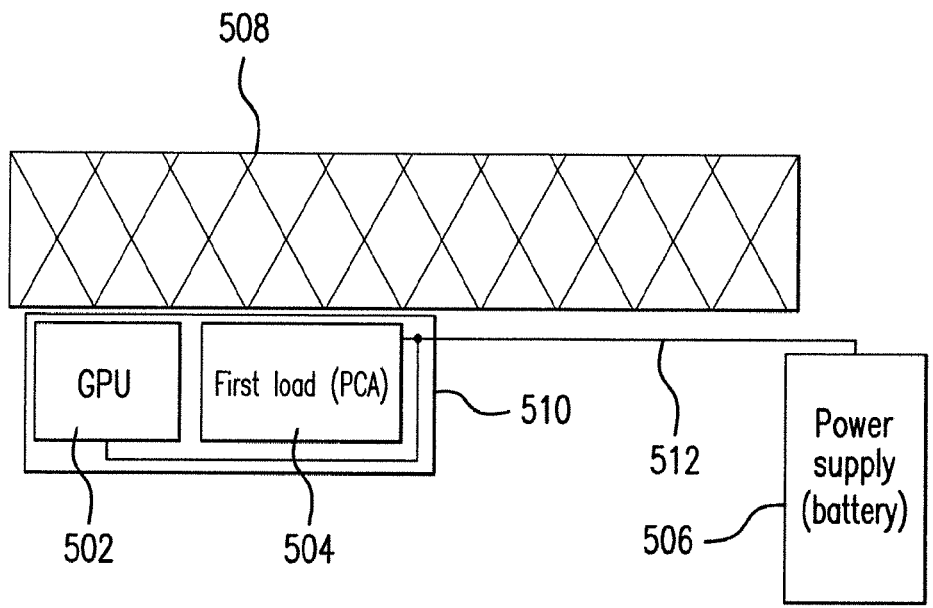
FIG. 6 shows a simplified schematic of another boarding bridge setup with installed GPU and PCA within a single housing, (a) with the GPU electrically coupled to the power supply from within the single housing and (b) with the GPU electrically coupled to the power supply from a distribution terminal provided on the single housing.
Figure 6B:
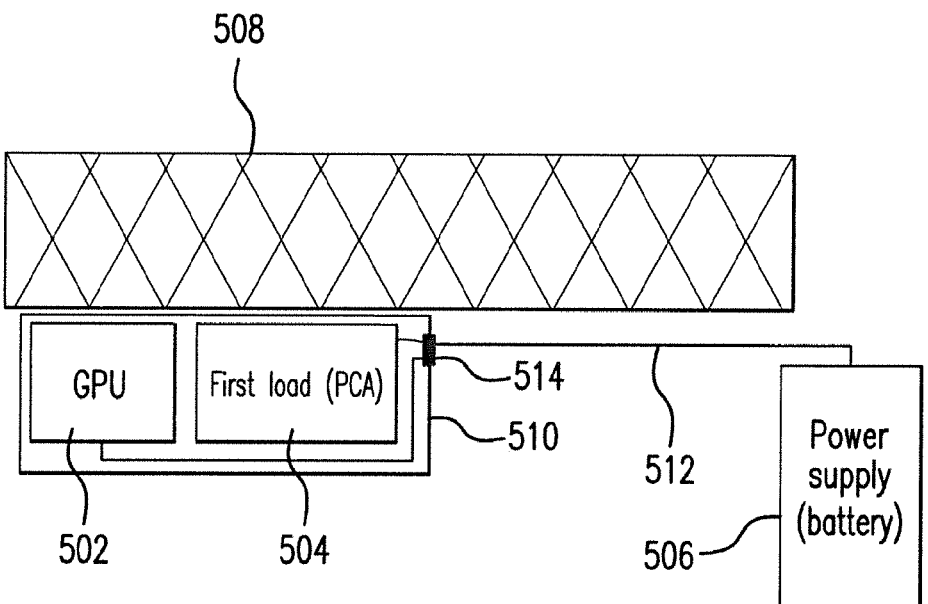

In yet another embodiment (i.e. FIG. 6(*a*)), the GPU(s) 502 may be electrically coupled to the power supply 506 from a connection to the power line cable 512 inside the housing 510, and where in yet another example embodiment (i.e. FIG. 6(*b*)), the GPU(s) 502 may be electrically coupled to the power supply 506 from a distribution terminal 514 (i.e. input terminal) provided on the housing 510 (or the housing of the PCA 504).

It will be appreciated by persons skilled in the art that the above embodiment(s) have been described by way of example only and not in any limitative sense, and that various alterations and modifications are possible without departing from the scope of the invention as defined by the appended claims.

The invention claimed is:

1. A power distribution system for an aircraft on the ground, comprising:
   a preconditioned air unit, operably coupleable to the aircraft on the ground and configured to receive at least a first portion of a predetermined maximum input power provided by a power supply;
   at least one ground power unit, electrically coupleable to the aircraft on the ground and configured to receive at least a second portion of the predetermined maximum input power provided by the power supply, and
   a controller, adapted to monitor at least one parameter of the power consumed by any one of the preconditioned air unit and the at least one ground power unit, and control the power consumption of at least the preconditioned air unit so that the total power consumption of the preconditioned air unit and the at least one ground power unit does not exceed the predetermined maximum input power;
   wherein the predetermined maximum input power is provided via a single power line between the power supply and an input port of the preconditioned air unit, wherein the predetermined maximum input power is a maximum acceptable power consumption.

2. The power distribution system according to claim 1, wherein the preconditioned air unit (PCA) is configured to provide air at a predetermined temperature to the aircraft on the ground.

3. The power distribution system according to claim 1, wherein the at least one parameter is an input current from the predetermined maximum input power provided to any one of the preconditioned air unit and the at least one ground power unit.

4. The power distribution system according to claim 1, further comprising at least one third electrical load, configured to receive at least a third portion of the predetermined maximum input power provided by the power supply.

5. The power distribution system according to claim 4, wherein the controller is adapted to control the power consumption of the at least one third electrical load so that the total power consumption of the preconditioned air unit, the at least one ground power unit and the at least one third electrical load does not exceed the predetermined maximum input power.

6. The power distribution system according to claim 4, wherein the at least one third electrical load is a battery-powered Ground Power Unit (GPU) chargeable with at least the third portion of the predetermined maximum input power.

7. The power distribution system according to claim 6, wherein the controller is adapted to control a charging current of the battery-powered GPU so that the total power consumption of any one of the preconditioned air unit, the at least one ground power unit and the at least one third electrical load does not exceed the predetermined maximum input power.

8. The power distribution system according to claim 7, wherein the charging current is controlled stepless via wireless communication or by selectively switching the charging current on and off.

9. The power distribution system according to claim 6, wherein the battery-powered GPU is electrically coupleable to any one of the preconditioned air unit, the power supply via any one of a pre-fused power outlet of the power supply and a splitter box, and the ground power unit.

10. The power distribution system according to claim 1, wherein the maximum acceptable power consumption is a maximum power rating of the power supply.

11. The power distribution system according to claim 1, further comprising a control interface adapted to control the predetermined maximum input power provided by the power supply from a remote location.

12. The power distribution system according to claim 10, wherein the first electrical load is a preconditioned air unit (PCA) configured to provide air at a predetermined temperature to the aircraft on the ground.

13. The power distribution system according to claim 12, wherein the controller is adapted to control the power consumed by the preconditioned air unit (PCA).

14. A power distribution system for an aircraft on the ground, comprising:
   a first electrical load, operably coupled to the aircraft on the ground and configured to receive at least a first portion of a predetermined maximum input power provided by a power supply;
   at least one second electrical load, electrically coupleable to the aircraft on the ground and configured to receive at least a second portion of the predetermined maximum input power provided by the power supply, and
   a controller, adapted to monitor at least one parameter of the power consumed by any one of the first electrical load and the at least one second electrical load, and control the power consumption of at least the first electrical load so that the total power consumption of the first electrical load and the at least one second electrical load does not exceed the predetermined maximum input power, wherein the at least one parameter is an input current from the predetermined maximum input power provided to any one of the first electrical load and the at least one second electrical load;

wherein the predetermined maximum input power is provided via a single power line between the power supply and an input port of the first electrical load.

15. The power distribution system according to claim 14, wherein the controller is adapted to control the power consumed by the preconditioned air unit (PCA).

16. The power distribution system according to claim 14, wherein the at least one second electrical load is a Ground Power Unit (GPU).

17. A power distribution system for an aircraft on the ground, comprising:
- a first electrical load, operably coupled to the aircraft on the ground and configured to receive at least a first portion of a predetermined maximum input power provided by a power supply;
- at least one second electrical load, electrically coupleable to the aircraft on the ground and configured to receive at least a second portion of the predetermined maximum input power provided by the power supply, and
- a controller, adapted to monitor at least one parameter of the power consumed by any one of the first electrical load and the at least one second electrical load, and control the power consumption of at least the first electrical load so that the total power consumption of the first electrical load and the at least one second electrical load does not exceed the predetermined maximum input power;
- wherein the predetermined maximum input power is provided via a single power line between the power supply and an input port of the first electrical load, wherein the predetermined maximum input power is a maximum power rating of the power supply.

* * * * *